United States Patent
Mertes et al.

(10) Patent No.: US 6,273,981 B1
(45) Date of Patent: Aug. 14, 2001

(54) METHOD FOR PRODUCING A STEERING WHEEL

(75) Inventors: Peter Mertes, Rottenburg/Neckar; Andreas Kellermann, Weil der Stadt, both of (DE)

(73) Assignee: Holzindustrie Bruchsal GmbH & Co. KG, Bruchsal (DE)

(*) Notice: Subject to any disclaimer, the term of this patent is extended or adjusted under 35 U.S.C. 154(b) by 0 days.

(21) Appl. No.: 09/359,117

(22) Filed: Jul. 23, 1999

(30) Foreign Application Priority Data

Jul. 24, 1998 (DE) .............................. 198 33 314

(51) Int. Cl.[7] .............................. B32B 31/00; B62D 1/04
(52) U.S. Cl. .......................... 156/152; 156/153; 156/257; 156/267; 156/278; 156/293; 74/552; 74/558; 29/894.1
(58) Field of Search ........................ 74/552, 558, 558.5; 29/894.1; 156/257, 267, 152, 153, 278, 293

(56) References Cited

U.S. PATENT DOCUMENTS 4,450,650 * 5/1984 Holden et al. ............................ 46/17
5,840,144 * 11/1998 Schumacher et al. ................ 156/267
6,012,354 * 1/2000 Futschik et al. ........................ 74/558

FOREIGN PATENT DOCUMENTS

4039138 C1 * 2/1992 (DE) ................................. B62D/1/06
2 142 299 A 1/1985 (GB).

* cited by examiner

Primary Examiner—Richard Crispino
Assistant Examiner—Cheryl N. Hawkins
(74) Attorney, Agent, or Firm—Venable; Robert Kinberg

(57) ABSTRACT

A method is described for producing a motor vehicle steering wheel that is provided with a cover. With this method, the ring and cover are manufactured separately and are subsequently joined. In order to produce the cover, two unfinished parts are initially produced, into which a groove is milled. Subsequently, a decorative layer is applied to the unfinished part. A layer of lacquer is applied to the unfinished parts that are joined to form a tubular ring segment. During the following operational step, the tubular ring segment is divided into two halves, which are joined with the ring and thus form the cover.

4 Claims, 3 Drawing Sheets

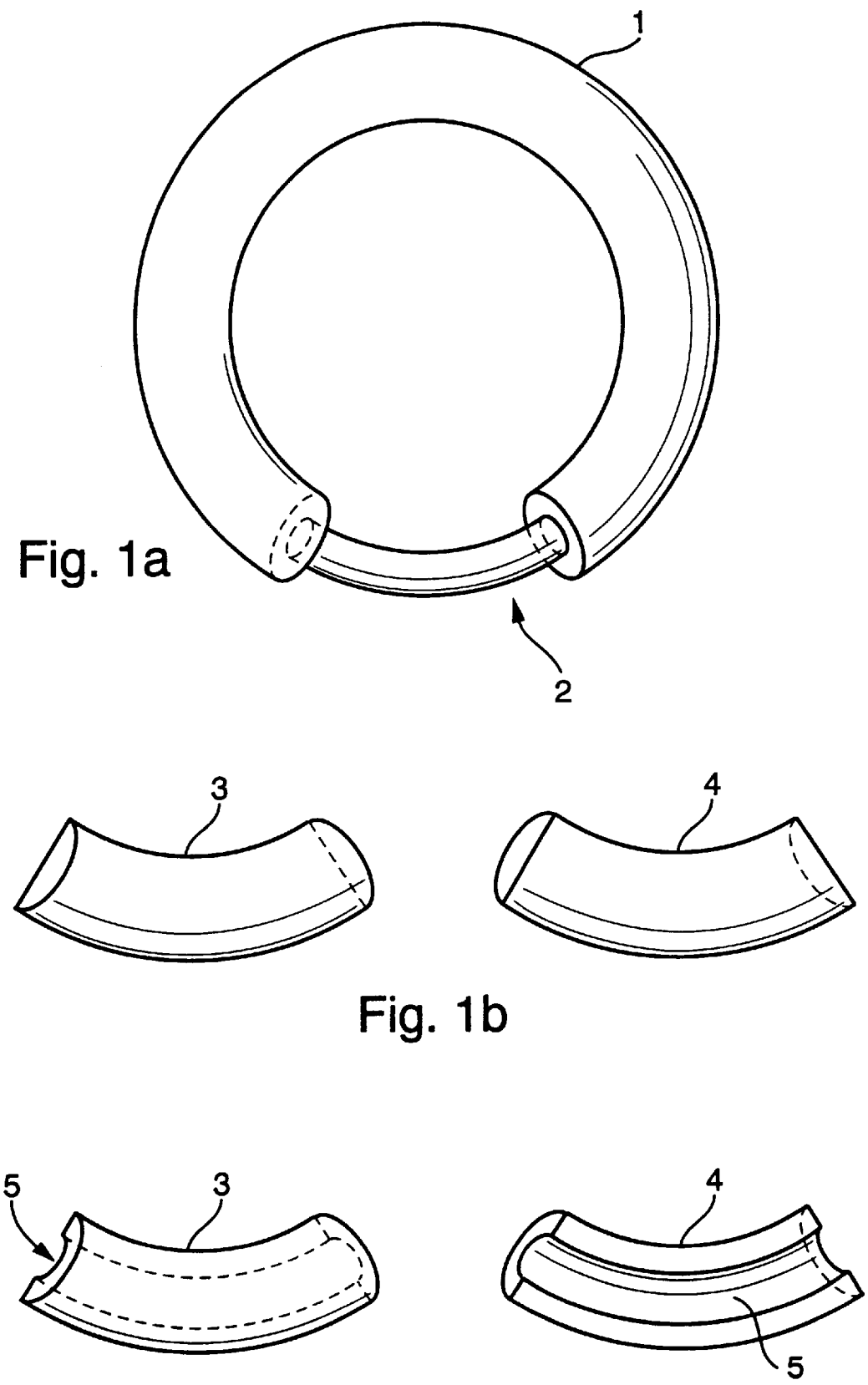

METHOD FOR PRODUCING A STEERING WHEEL

CROSS-REFERENCE TO RELATED APPLICATION

This application claims the priority of patent application Ser. No. 198 33 314.5, filed in Germany on Jul. 24, 1998, the subject matter of which is incorporated herein by reference.

BACKGROUND OF THE INVENTION

The invention relates to a method for producing a motor vehicle steering wheel, having a ring with at least one segment provided with a cover.

Steering wheels in passenger vehicles and utility vehicles are frequently manufactured not from one type of material alone, but also have so-called covers made of different materials. The unfinished steering wheel part, consisting of a ring with inserted impact-absorbing element, is for the most part made of plastic. The covers can consist, for example, of wood, stone, leather or fabric. As a result, steering wheels can be configured in many different ways and can thus increase the value of the motor vehicle inside space.

The methods known so far require several successive operational steps to attach the covers to the unfinished steering wheel parts. This operation takes place either before or after the impact-absorbing element is inserted into the ring. A disadvantage in this case is that the ring and the impact-absorbing element must be protected during the processing of the cover as they might otherwise be damaged. Consequently, the manufacture of such steering wheels becomes very involved and expensive. If the cover is actually damaged during the application, the complete arrangement of ring with impact-absorbing element and cover frequently cannot be used any more.

It is the object of the present invention to demonstrate a method, which allows a simple and cost-effective production of a steering wheel of the aforementioned type.

SUMMARY OF THE INVENTION

The method according to the invention provides that in the case of a motor vehicle steering wheel with a ring, which has at least one segment with cover, a ring with preferably round cross section and at least one region of reduced circular cross section is initially produced. This region functions to accommodate the cover during a later processing step.

The ring, which is preferably compression-molded from a suitable plastic material, in this case can be produced together with an impact-absorbing element that is fixedly connected to the ring with the aid of one or more spokes.

Chronologically independent of this, two identical unfinished steering wheel parts are respectively manufactured, which correspond to the number of regions. The covers are produced from these unfinished parts during the following processing steps. The arc length of the unfinished parts corresponds to that of the area (2). They have a semicircular cross section, for which the diameter is smaller than that of the circular cross section of the ring. If the cover is to be used in the gripping range, then the unfinished parts can already contain finger indentations.

Following this, a channel-shaped groove is milled into the unfinished part, starting with the level inside surfaces and respectively in longitudinal direction. These grooves correspond to the shape of the ring in the region of the reduced circular cross section.

A decorative layer, e.g. of rare wood, is applied to the convex outside surfaces of the unfinished parts. This decorative layer essentially determines the look of the cover.

The coated, unfinished parts are then joined during the following processing step along their level inside surfaces to form a tubular ring segment.

A coat of lacquer is subsequently applied over the decorative layer of the tubular ring segment. This coat of lacquer protects the decorative layer from outside influences, and additionally provides various design options through the use of different types of lacquer.

The tubular ring segment is then divided into two equal halves. The halves formed in this way together form the cover.

An adhesive is applied to the grooves as well as the parting planes of the halves. The adhesive selection is based on the materials used to produce the ring and the halves.

The two halves are pressed onto the steering wheel ring in the region of the reduced circular cross section. In that case, the arrangement must remain fixed in place until the adhesive has hardened. The two halves then enclose the ring completely in the region of the reduced circular cross section. The circular cross section of the ring in the region provided with the cover approximately corresponds to its circular cross section in the segments without a cover.

In a last processing step, the adhesive residues can be removed in the region of the adhesive joints. This final treatment of the adhesive joints may be necessary if excess adhesive is pushed out of the adhesive joints and hardens on the surface while the two halves are pressed onto the ring. The adhesive residues must be removed with the utmost care, so that the surface of the lacquer coat is not damaged.

The method according to the invention thus makes it possible to manufacture the steering wheel ring and its cover separately and subsequently join the two. Consequently, it is no longer necessary to protect the ring and the impact-absorbing element during the processing of the cover. A considerable reduction in the production expenditure results, which permits a cost-effective production.

Another advantage of the method is that the two steering wheel components can be produced in sufficient numbers to have in stock and, depending on the demand, can be produced quickly.

According to one advantageous embodiment of the method, the unfinished parts for the cover can be produced from two or more different materials. The type and composition of the varied materials in that case is determined by the required characteristics for the cover.

It makes sense if after the removal of the adhesive residues in the region of the adhesive joints, the transitions between ring and cover, as well as between the two halves are reworked. In the process, the transitions can be ground and polished, for example, to remove slight irregularities at the locations where identical and different materials are joined. With this, a clean transition is created between ring and cover and between the two halves of the cover. However, a careful mode of operation is required in this case as well, so that the surface of the ring and the coat of lacquer on the cover are not damaged.

Prior to applying the decorative layer onto the unfinished parts, it is particularly advantageous to drill respectively aligned positioning holes into the unfinished parts, starting from their level inside surfaces. Locating pins are inserted into these bores prior to the joining. As a result, a precise joining of the unfinished parts before the application of the lacquer coat is ensured.

BRIEF DESCRIPTION OF THE DRAWINGS

These and other features and advantages of the invention will be further understood from the following detailed description of the preferred embodiments with reference to the accompanying drawings in which:

FIGS. 1a to 1f Show a schematic representation of the operational sequence;

DETAILED DESCRIPTION OF THE PREFERRED EMBODIMENTS

The ring 1 with circular cross section, shown in FIG. 1a, is produced as one piece and has a region 2 with reduced circular cross section. This region 2 is used to accommodate a cover produced during the following operational steps.

Figure 1b shows two identically formed unfinished parts 3, 4 for the cover, which have a semi-circular cross section and an arc length that corresponds to at least the arc length of the region 2 of ring 1. The cross-sectional diameter of these parts is somewhat less than the circular cross section of ring 1.

Figure 1c shows the unfinished parts 3, 4. A channel-shaped groove 5 is respectively milled into these parts, starting from their level inside surfaces and in longitudinal direction. The groove 5 has a semi-circular cross section and corresponds to the shape of ring 1 in the region 2 of its reduced circular cross section.

Figure 1D:
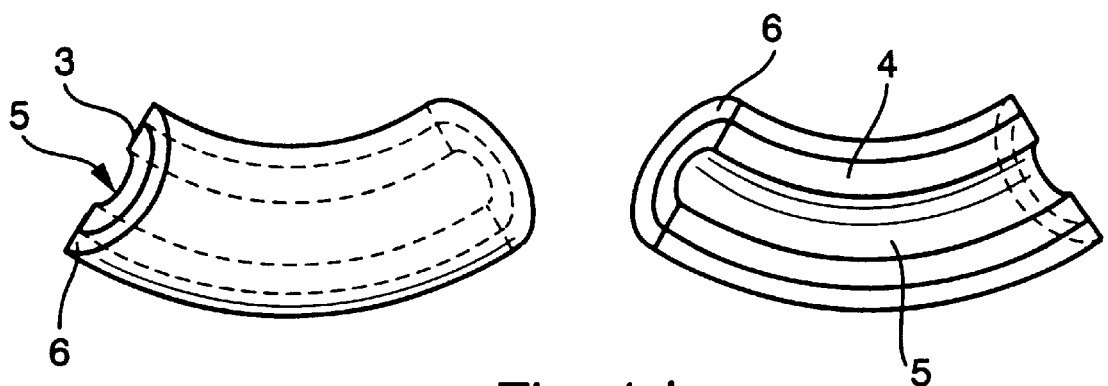

Figure 1d shows the two unfinished parts 3, 4 with a thick decorative layer 6 applied to its convex outer surface. This layer respectively covers the convex outer surfaces of the unfinished parts 3, 4 completely. No coating is applied to the level inside surfaces.

Figure 1E:
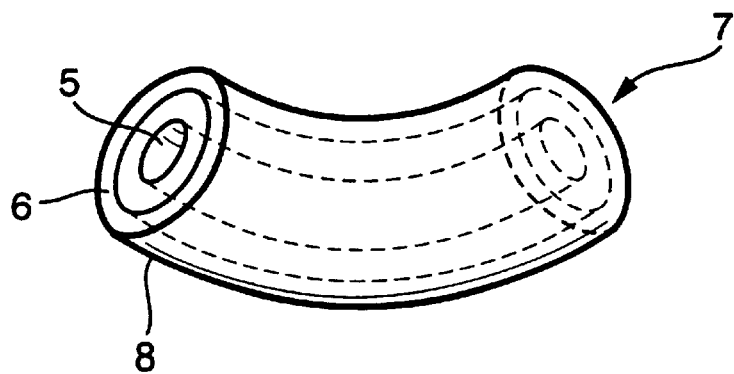

The two coated unfinished parts 3, 4 are subsequently joined along their level inside surfaces to form a tubular ring segment 7. The tubular ring segment 7 shown in FIG. 1e has the approximate shape of a circular arc. A thin layer of lacquer 8 is additionally applied over its decorative layer 6. The tubular ring segment 7 with dual coating then has approximately the same circular cross section as the ring 1.

Figure 1F:
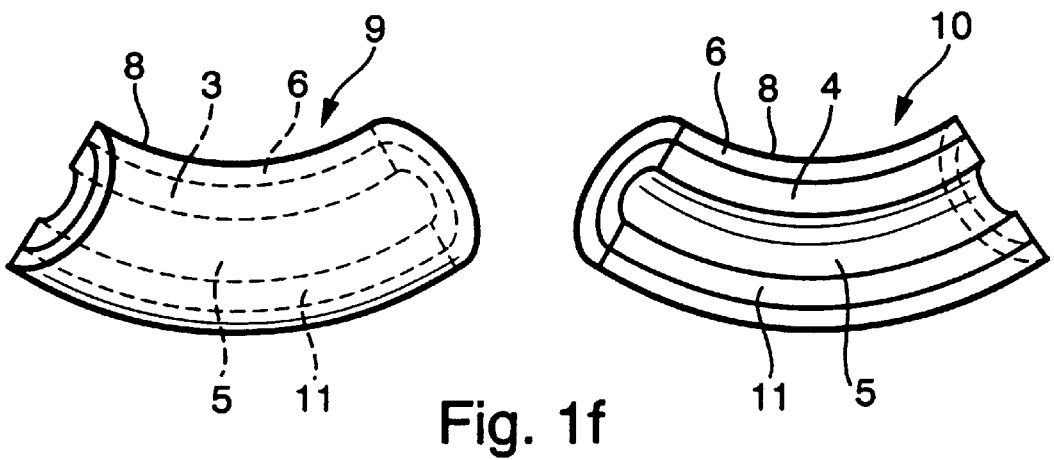

The tubular ring segment 7 with double coating is subsequently divided into a first half 9 and a second half 10. These halves are shown in Figure 1f. The two curved halves 9, 10 have a groove-shaped cross section. They comprise respectively one level parting plane 11, into which the groove 5 is milled. On the side opposite the parting plane 11, the halves 9, 10 are each covered with the decorative layer 6 and the lacquer layer 8.

An adhesive 15 is applied to the groove 5 as well as the parting planes 11 of the two halves 9, 10.

Following that, the two halves 9, 10 are pressed onto the ring 1 in the region 2. The adhesive 15 joins the two halves 9, 10 to each other and to the ring 1.

Figure 2:
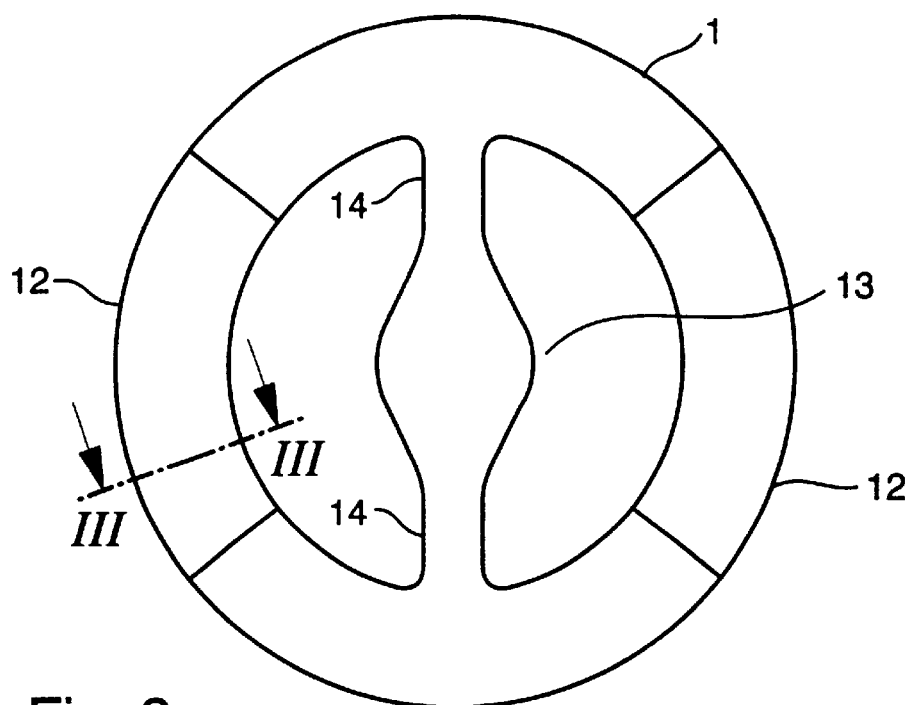
FIG. 2 Shows a steering wheel produced with the method according to the invention.

The steering wheel shown in FIG. 2 is produced with the aid of the method according to the invention. The impact-absorbing element 13 is fixedly connected to the ring 1 with two spokes 14. It is also conceivable that more than two spokes 14 are used. The ring 1 is provided at two locations with opposite arranged, inserted covers 12, which are produced with the aid of the method according to the invention and are glued to the ring 1. Of course, it is possible for the steering wheel to have several covers 12. The ring 1 of the steering wheel with the two covers 12 has a nearly constant circular cross section.

Figure 3:
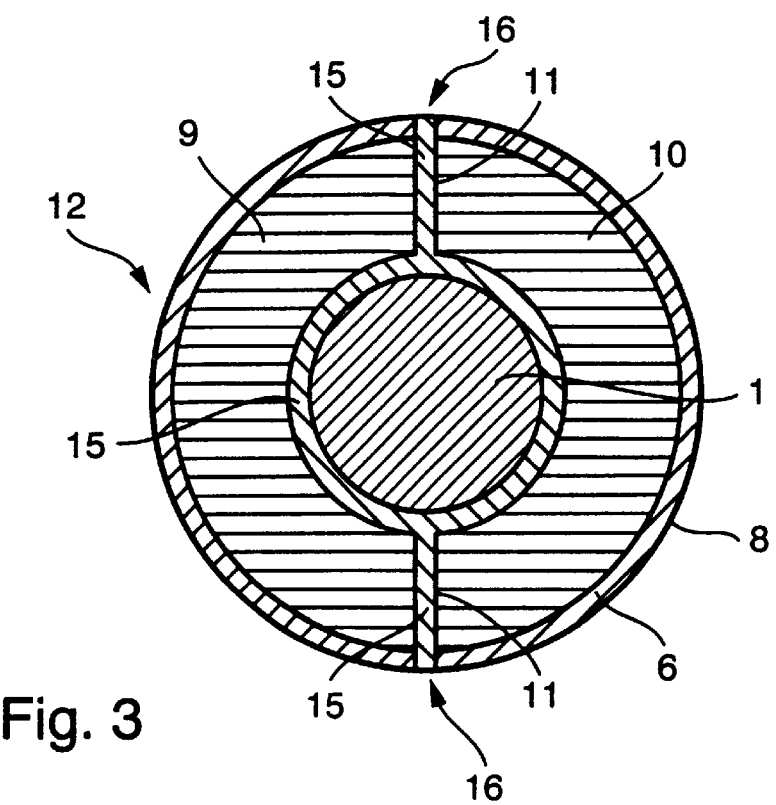
FIG. 3 Shows a section through the steering wheel.

The cross section along the line III—III through the steering wheel in FIG. 2, in the region of cover 12, is shown in FIG. 3.

The ring 1 is arranged centrally. This ring is completely covered by the cover 12, which is joined together from the first half 9 and the second half 10. The two halves 9, 10 are joined to each other and to the ring 1 with the adhesive 15.

On the side with convex shape, the two halves 9, 10 are coated with the decorative layer 6 and the lacquer layer 8. The two opposite-arranged grooves 5 in the parting planes 11 of halves 9, 10 form a hollow space, which is adapted exactly to the shape of the ring in the region 2 with reduced circular cross section.

The parting planes 11 of the two halves 9, 10 are joined with the adhesive 15. An adhesive joint 16, which is filled with the adhesive 15, is located between the opposite arranged parting planes 11.

The adhesive residues, which may have been pushed out of the adhesive joints 16 when the two halves 9, 10 were fitted together and pressed onto the ring 1, were removed. The clean transition between lacquer surface 8 and adhesive joints 16 can be obtained by grinding and/or polishing the surface in the region of adhesive joints 16.

It will be understood that the above description of the present invention is susceptible to various modifications, changes and adaptations, and the same are intended to be comprehended within the meaning and range of equivalents of the appended claims.

What is claimed is:

1. A method for producing a steering wheel comprising a ring for a motor vehicle, for which the ring has at least one segment with a cover, said method comprising, the following processing steps:

produce the ring with at least one region of reduced circular cross section for accommodating the cover;

manufacturing two identical unfinished parts that correspond to an arc length of the aforementioned region, which parts have a semi-circular cross section with a diameter that is smaller than the diameter of the circular cross section;

milling in of respectively one channel-shaped groove, starting from the level inside surfaces of the unfinished parts and corresponding to the form of the region with reduced circular cross section;

applying a decorative layer onto the outside surfaces of the unfinished parts;

joining the two unfinished parts along their inside surfaces to form a tubular ring segment;

applying a layer of lacquer over the decorative layer of the tubular ring segment;

separating the tubular ring segment in a longitudinal direction into two equal halves;

applying an adhesive to the groove, as well as to the parting planes of the halves;

pressing the two halves onto the ring, forming the cover, in the region of reduced cross section.

2. A method according to claim 1, wherein the unfinished parts are manufactured from several different materials.

3. A method according to claim 1, wherein the transitions between ring and cover and between the two halves are reworked in the region of the adhesive joints.

4. A method according to claim 1, wherein respectively two aligned positioning holes are drilled, starting from the inside surface of the unfinished parts and prior to applying the decorative layer, into which holes positioning pins are inserted before the unfinished parts are joined.

\* \* \* \* \*